(12) United States Patent
Masuda et al.

(10) Patent No.: US 7,500,355 B2
(45) Date of Patent: Mar. 10, 2009

(54) EXHAUST EMISSION PURIFYING APPARATUS FOR ENGINE

(75) Inventors: Kouji Masuda, Ageo (JP); Kiminobu Hirata, Ageo (JP); Nobuhiko Masaki, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 23 days.

(21) Appl. No.: 11/392,636

(22) Filed: Mar. 30, 2006

(65) Prior Publication Data

US 2006/0236681 A1    Oct. 26, 2006

Related U.S. Application Data

(63) Continuation of application No. PCT/JP2004/012746, filed on Sep. 2, 2004.

(30) Foreign Application Priority Data

Sep. 30, 2003   (JP)   .............................. 2003-340079
Mar. 25, 2004   (JP)   .............................. 2004-088490

(51) Int. Cl.
*F01N 3/00* (2006.01)
(52) U.S. Cl. .............................. 60/286; 60/277; 60/295; 60/301; 60/303
(58) Field of Classification Search .................. 60/277, 60/286, 295, 300, 301, 303; 422/169, 171, 422/172, 173, 174, 182, 183
See application file for complete search history.

(56) References Cited

U.S. PATENT DOCUMENTS 5,628,186 A * 5/1997 Schmelz ..................... 60/274
5,983,630 A * 11/1999 Kibe et al. .................. 60/285
6,253,547 B1 * 7/2001 Watanabe et al. ........... 60/297
6,357,226 B2 * 3/2002 Borland ...................... 60/298

(Continued)

FOREIGN PATENT DOCUMENTS

JP    06-317143    11/1994

(Continued)

OTHER PUBLICATIONS

Supplemental European Search Report for corresponding Application No. EP 04 78 7626, dated Nov. 24, 2006.

(Continued)

*Primary Examiner*—Tu M Nguyen
(74) *Attorney, Agent, or Firm*—Baker & Hostetler LLP

(57) ABSTRACT

In order to suppress deposition of constituent of a reducing agent (dissolved matter) in an exhaust passage of an engine enhancing an elimination rate of NOx even when temperature of an exhaust emission from the engine is low, an exhaust emission purifying apparatus is provided with an electro-generative-heat carrier provided on an upstream side of an injection nozzle that supplies the reducing agent into the exhaust emission on upstream side of a reduction catalyst in an exhaust pipe, the exhaust emission being heated to a temperature equal to or higher than a melting point of the dissolved matter whereby deposition of the dissolved matter on an inner wall surface of the exhaust pipe is suppressed to effectively use the supplied reducing agent for catalytic reduction reaction, even when the exhaust emission temperature is lower than the melting point of the dissolved matter of the reducing agent.

4 Claims, 5 Drawing Sheets

U.S. PATENT DOCUMENTS

| | | | |
|---|---|---|---|
| 6,619,035 B2 * | 9/2003 | Matsuoka et al. | 60/286 |
| 6,826,906 B2 * | 12/2004 | Kakwani et al. | 60/303 |
| 2001/0042536 A1 | 11/2001 | Borland | |
| 2003/0033799 A1 | 2/2003 | Scheying | |
| 2005/0013756 A1 * | 1/2005 | Amou et al. | 423/239.1 |
| 2006/0248881 A1 * | 11/2006 | Yokota | 60/286 |

FOREIGN PATENT DOCUMENTS

| | | |
|---|---|---|
| JP | 08-200048 | 8/1996 |
| JP | 08-246850 | 9/1996 |
| JP | 2000-027627 | 1/2000 |
| JP | 2002-038939 | 2/2002 |
| JP | 2002-161732 | 6/2002 |
| JP | 2003-074331 | 3/2003 |
| JP | 2003-120279 | 4/2003 |
| JP | 2003-232218 | 8/2003 |

OTHER PUBLICATIONS

"Catalysts & Catalysis", vol. 45, No. 3, 2003, Catalysis Society of Japan, published on Apr. 10, 2003, p. 227.

* cited by examiner

EXHAUST EMISSION PURIFYING APPARATUS FOR ENGINE

This application is a continuation of PCT/JP2004/012746, filed on Sep. 2, 2004.

BACKGROUND OF THE INVENTION

1. Field of the Invention

The present invention relates to an exhaust emission purifying apparatus for an engine for reducing and eliminating nitrogen oxides (NOx) which is emitted from a diesel engine, a gasoline engine, or the like mounted on a mobile vehicle, by supplying a reducing agent into an exhaust emission on an upstream side of a reduction catalyst, and particularly, relates to an exhaust emission purifying apparatus for an engine for suppressing deposition of a constituent of the reducing agent (solute of the reducing agent) in an exhaust passage to enhance an elimination rate of NOx even if an exhaust temperature from the engine is low and for detecting deposition and accumulation of the constituent of the reducing agent in the exhaust passage.

2. Description of the Related Art

As a system for eliminating especially NOx out of particulate matter (PM) in exhaust emission emitted from the engine to purify the exhaust emission, there are proposed some exhaust emission purifying apparatuses. In such an exhaust emission purifying apparatus, a reduction catalyst is disposed in an exhaust system of the engine, a reducing agent is injection-supplied to an exhaust passage on an upstream side of the reduction catalyst, and NOx in the exhaust emission is catalytic reduced by the reducing agent and is subjected to a process of purification to be converted into harmless components. The reducing agent is stored in a liquid state at room temperature in a storage tank and a required amount thereof is injection-supplied from an injection nozzle. For the reduction reaction, ammonia with satisfactory reactivity with NOx is used. As the reducing agent, a urea aqueous solution, an ammonia aqueous solution, and other reducing agent aqueous solutions which hydrolyze to easily generate ammonia are used (see Japanese Unexamined Patent Application No. 2000-27627 and "Catalysts & Catalysis" Vol. 45 No. 3 2003, Catalysis Society of Japan, published on Apr. 10, 2003, page 227, for example).

However, in the above conventional exhaust emission purifying apparatus, when an exhaust temperature from the engine is lower than 132° C., for example, there is a possibility that urea in the urea aqueous solution (hereafter referred to as "urea water") as the reducing agent injection-supplied into an exhaust emission in an exhaust passage is precipitated or deposited and adheres on an inner wall surface of an exhaust pipe. Namely, since the urea water condensates at about 100° C. and a melting point of urea is 132° C., the urea remains precipitated in a temperature range in which the exhaust emission exhausted from the engine is equal to or higher than 100° C. at which the urea water condensates but lower than 132° C. which is the melting point of urea. In this case, the urea water is reduced by an amount corresponding to the precipitated urea, the urea water injection-supplied from the injection nozzle is not effectively used for the catalytic reduction reaction, there is a possibility that NOx cannot satisfactorily be reduced and eliminated, and an elimination rate of NOx might decrease in some cases.

Moreover, when only moisture evaporates from the urea water injection-supplied into the exhaust emission on the upstream side of the reduction catalyst and urea is precipitated and accumulates in the exhaust pipe in the vicinity of the injection nozzle, the accumulated urea forms obstruction against flowing of the exhaust emission in the exhaust pipe. Therefore, there might be possibility of increase in exhaust pressure and decrease of mileage. When diesel oil, gasoline, alcohol, or the like is used as a reducing agent, there may be a similar possibility that a constituent such as a carbon is precipitated and accumulates in the exhaust pipe.

SUMMARY OF THE INVENTION

Therefore, in view of such problems, it is an object of the present invention to provide an exhaust emission purifying apparatus for an engine with which deposition of a reducing agent in an exhaust passage is suppressed even if an exhaust temperature from an engine remains low thereby enhancing an elimination rate of NOx and which can detect accumulation of a constituent of the reducing agent due to the deposition of the constituent in the exhaust passage.

According to claim 1, there is provided an exhaust emission purifying apparatus for an engine, comprising: an oxidation catalyst disposed in an exhaust system of the engine to reduce nitrogen monoxide in exhaust emission by oxidation reaction; a reduction catalyst disposed in the exhaust system to reduce and purify nitrogen oxides in the exhaust emission by using a reducing agent; and reducing agent supply means having an injection nozzle that supplies the reducing agent on an exhaust emission upstream side of the reduction catalyst in an exhaust passage of the exhaust system, wherein heating means is provided on the exhaust emission upstream side of the injection nozzle, the heating means heating the exhaust emission in the exhaust passage to a temperature equal to or higher than a melting point of dissolved matter of the reducing agent.

With this configuration, the exhaust emission in the exhaust passage is heated to the temperature equal to or higher than the melting point of the dissolved matter of the reducing agent by the heating means provided on the upstream side of the injection nozzle for supplying the reducing agent on the exhaust emission upstream side of the reduction catalyst in the exhaust passage of the exhaust system. Thus, deposition of the dissolved matter of the reducing agent is appreciably suppressed.

In accordance with an invention according to claim 2, temperature detecting means is provided on the exhaust emission upstream side and in a vicinity of the injection nozzle, the temperature detecting means detecting a temperature of the exhaust emission in the exhaust passage and controlling an operation of the heating means according to a detection signal of the temperature detecting means. Thus, the temperature of the exhaust emission in the exhaust passage is detected by the temperature detecting means provided on the exhaust emission upstream side and in the vicinity of the injection nozzle, and the operation of the heating means is controlled by the detection signal of the temperature detecting means.

In accordance with an invention according to claim 3, the reducing agent includes a urea aqueous solution. In this way, by using the urea aqueous solution which hydrolyzes and easily generates ammonia is used as the reducing agent, nitrogen oxides in the exhaust emission is reduced and purified.

In accordance with an invention according to claim 4, the temperature that the exhaust emission has upon being heated by the heating means should be equal to or higher than 132° C. In this way, the exhaust emission in the exhaust passage is heated by the heating means to the temperature equal to or higher than the melting point of urea in the urea aqueous solution.

In accordance with an invention according to claim 5, the temperature that the exhaust emission has upon being heated by the heating means should be equal to or higher than 160° C. In this way, the exhaust emission in the exhaust passage is heated by the heating means to the temperature equal to or higher than the melting point of urea in the urea aqueous solution and to the temperature at which the urea aqueous solution generates ammonia in larger quantity.

In accordance with an invention according to claim 6, the heating means is disposed through substantially the whole area of a cross section of the exhaust passage and is an electro-generative-heat carrier having a porous structure to generate heat when current is drawn through the electro-generative-heat carrier. In this way, by permitting an electric current to pass through the electro-generative-heat carrier having the porous structure and disposed through substantially the whole area of the cross section of the exhaust passage, the exhaust emission in the exhaust passage is heated to the temperature equal to or higher than the melting point of the dissolved matter of the reducing agent through substantially the whole area of the section of the passage.

According to claim 7, there is provided an exhaust emission purifying apparatus for an engine comprising: an oxidation catalyst disposed in an exhaust system of the engine to reduce nitrogen monoxide in the exhaust emission by oxidation reaction; a reduction catalyst disposed in the exhaust system to reduce and purify nitrogen oxides in the exhaust emission by using a reducing agent; and reducing agent supply means having an injection nozzle for supplying the reducing agent on an exhaust emission upstream side of the reduction catalyst in an exhaust passage of the exhaust system, wherein the apparatus includes: first temperature difference detecting means for detecting a temperature difference between an outer wall temperature of the exhaust passage and an exhaust emission temperature at a portion to which the reducing agent supplied from the injection nozzle adheres; second temperature difference detecting means for detecting a temperature difference between an outer wall temperature of the exhaust passage and an exhaust emission temperature at a portion to which the reducing agent does not adhere; and first determining means for determining that a constituent of the reducing agent has accumulated in the exhaust passage when the temperature difference detected by the first temperature difference detecting means becomes greater than the temperature difference detected by the second temperature difference detecting means by a value equal to or greater than a predetermined value.

With this structure, the temperature difference between the outer wall temperature of the exhaust passage and the exhaust emission temperature at the portion to which the reducing agent supplied from the injection nozzle adheres is detected by the first temperature difference detecting means, the temperature difference between the outer wall temperature of the exhaust passage and the exhaust emission temperature at the portion to which the reducing agent does not adhere is detected by the second temperature difference detecting means, and it is determined by the first determining means that the constituent of the reducing agent has accumulated in the exhaust passage when the temperature difference detected by the first temperature difference detecting means becomes greater than the temperature difference detected by the second temperature difference detecting means by a value equal to or greater than the predetermined value.

In accordance with an invention according to claim 8, transient operation detecting means is provided to detect that the engine is in a transient operating state, and the first determining means determines whether or not the constituent of the reducing agent has accumulated in the exhaust passage, only when it is detected that the engine is in the transient operating state. In this way, the transient operation detecting means detects that the engine is in the transient operating state and the first determining means determines whether or not the constituent of the reducing agent has accumulated in the exhaust passage, only when it is detected that the engine is in the transient operating state.

In accordance with an invention according to claim 9, alarm means for actuating an alarm indicating that the constituent of the reducing agent has accumulated in the exhaust passage and alarm control means for controlling actuation of the alarm means when it is determined that the constituent of the reducing agent has accumulated in the exhaust passage are provided. In this way, the alarm control means controls actuation of the alarm means when it is determined that the constituent of the reducing agent has accumulated in the exhaust passage, and the alarm means actuates the alarm indicating that the constituent of the reducing agent has accumulated in the exhaust passage.

Moreover, according to claim 10, there is provided an exhaust emission purifying apparatus for an engine, comprising: an oxidation catalyst disposed in an exhaust system of the engine to reduce nitrogen monoxide in exhaust emission by oxidation reaction; a reduction catalyst disposed in the exhaust system to reduce and purify nitrogen oxides in the exhaust emission by using a reducing agent; and reducing agent supply means having an injection nozzle for supplying the reducing agent on an exhaust emission upstream side of the reduction catalyst in an exhaust passage of the exhaust system, wherein the apparatus includes differential pressure detecting means for detecting a differential pressure between a pressure in the exhaust passage on the exhaust emission upstream side and a pressure in the exhaust passage on an exhaust emission downstream side of a portion to which the reducing agent adheres and second determining means for determining that the constituent of the reducing agent has accumulated in the exhaust passage when the differential pressure detected by the differential pressure detecting means becomes equal to or greater than a predetermined pressure.

With this configuration, the differential pressure detecting means detects the differential pressure between the pressure in the exhaust passage on the exhaust emission upstream side and the pressure in the exhaust passage on the exhaust emission downstream side of the portion to which the reducing agent adheres and the second determining means determines that the constituent of the reducing agent has accumulated in the exhaust passage when the differential pressure detected by the differential pressure detecting means becomes equal to or greater than the predetermined pressure.

In accordance with an invention according to claim 11, there are provided alarm means that performs an alarm operation indicating that the constituent of the reducing agent has accumulated in the exhaust passage and alarm control means that controls operation of the alarm means when it is determined that the constituent of the reducing agent has accumulated in the exhaust passage. In this way, the alarm control means controls operation of the alarm means when it is determined that the constituent of the reducing agent has accumulated in the exhaust passage, and the alarm means performs the alarm operation indicating that the constituent of the reducing agent has accumulated in the exhaust passage.

With the exhaust emission purifying apparatus according to claim 1, it is possible to suppress accumulation of the dissolved matter of the reducing agent by deposition in the exhaust passage even if the temperature of the exhaust emission from the engine is lower than the melting point of the dissolved matter of the reducing agent thereby effectively making use of the reducing agent supplied from the injection nozzle for the catalytic reduction reaction. Therefore, it is possible to purify and turn NOx contained in the exhaust emission into harmless components to enhance an elimination rate of NOx.

With the invention according to claim 2, the temperature of the exhaust emission in the exhaust passage is detected and the heating means is operated when the temperature is lower than the melting point of the dissolved matter of the reducing agent, to thereby heat the exhaust emission on the exhaust emission upstream side and in the vicinity of the injection nozzle to the temperature equal to or higher than the melting point of the dissolved matter of the reducing agent. Therefore, it is possible to suppress depositing of the dissolved matter of the reducing agent so as to enhance the elimination rate of NOx.

Furthermore, with the invention according to claim 3 by the employment of the urea aqueous solution, which hydrolyzes and easily generates ammonia, instead of direct use of the ammonia as the reducing agent, it is possible to purify and turn NOx contained in the exhaust emission into harmless components so as to enhance the elimination rate of NOx.

Moreover, with the invention according to claim 4, even if the temperature of the exhaust emission from the engine is lower than the melting point (132° C.) of urea, deposition of urea in the exhaust passage can be suppressed to thereby enable it to make an effective use of the urea aqueous solution supplied from the injection nozzle for the catalytic reduction reaction. Therefore, it is possible to enhance the elimination rate of NOx.

With the invention according to claim 5, even if the temperature of the exhaust emission from the engine is lower than 160° C., deposition of urea in the exhaust passage can be suppressed and the urea aqueous solution is brought into a state in which it can generate ammonia in larger quantity, to thereby facilitate the reduction reaction of NOx and enhance the elimination rate of NOx.

With the invention according to claim 6, it is possible to rapidly heat the exhaust emission in the exhaust passage to the temperature equal to or higher than the melting point of the dissolved matter of the reducing agent. Therefore, deposition of the dissolved matter of the reducing agent can be suppressed, to thereby enhance the elimination rate of NOx.

With the exhaust emission purifying apparatus according to claim 7, when the temperature difference between the outer wall temperature of the exhaust passage and the exhaust emission temperature at the portion to which the reducing agent supplied from the injection nozzle into the exhaust passage on the exhaust emission upstream side of the reduction catalyst adheres becomes greater than the temperature difference between the outer wall temperature of the exhaust passage and the exhaust emission temperature at the portion to which the reducing agent does not adhere by the value equal to or greater than the predetermined value, it is determined that the constituent of the reducing agent has accumulated. This is because the heat of the exhaust emission becomes less likely to be transmitted to the outer wall at the portion where the constituent of the reducing agent has accumulated. In this way, it can be detected that the constituent of the reducing agent supplied from the injection nozzle has accumulated in the exhaust passage.

With the invention according to claim 8, only when the engine is in the transient operating state, whether or not the constituent of the reducing agent has accumulated in the exhaust passage is determined. Therefore, it is possible to prevent erroneous detection of accumulation of the constituent of the reducing agent due to noise and the like during a steady operation in which the outer wall temperature of the exhaust passage and the exhaust emission temperature are in state of thermal equilibrium.

With the invention according to claim 9, the alarm means actuates the alarm when it is determined that the constituent of the reducing agent has accumulated. Therefore, it is possible to readily become aware of the fact that the constituent of the reducing agent has accumulated in the exhaust passage.

With the exhaust emission purifying apparatus according to claim 10, when the differential pressure between the pressure in the exhaust passage on the exhaust emission upstream side and the pressure in the exhaust passage on the exhaust emission downstream side of the portion to which the reducing agent supplied from the injection nozzle into the exhaust passage on the exhaust emission upstream side of the reduction catalyst adheres becomes equal to or higher than the predetermined pressure, it is determined that the constituent of the reducing agent has accumulated in the exhaust passage. When the constituent of the reducing agent accumulates in the exhaust passage, a flow passage area in the exhaust passage is reduced and a resistance against flowing of the exhaust emission becomes large, and therefore a difference between pressures in front and at the rear of the accumulation increases. In this way, it is possible to detect that the constituent of the reducing agent supplied from the injection nozzle has accumulated in the exhaust passage.

With the invention according to claim 11, the alarm means performs the alarm operation when it is determined that the constituent of the reducing agent has accumulated. Therefore, it is possible to readily become aware of the fact that the constituent of the reducing agent has accumulated in the exhaust passage.

DESCRIPTION OF THE PREFERRED EMBODIMENTS

Embodiments of the present invention will now be described below in detail with reference to the accompanying drawings.

Figure 1:
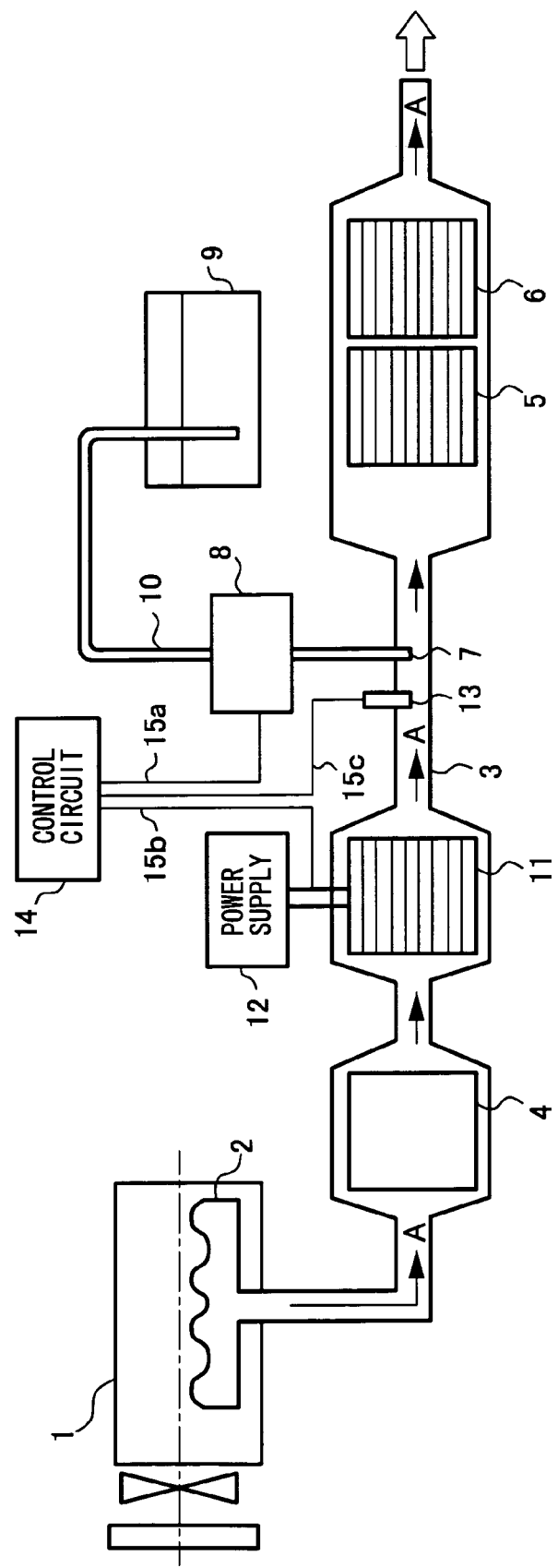
FIG. 1 is a diagrammatic view illustrating a system structure of an exhaust emission purifying apparatus for an engine, according to a first embodiment of the present invention.

FIG. 1 shows a structure of an exhaust emission purifying apparatus for an engine according to a first embodiment of the invention. This exhaust emission purifying apparatus reduces and eliminates NOx emitted from a diesel engine, a gasoline engine, or the like mounted on a mobile vehicle by using a reducing agent. The exhaust emission of the engine 1 using gasoline or diesel oil as fuel is emitted into the air from an exhaust pipe 3 as an exhaust passage through an exhaust manifold 2. Specifically, in the exhaust pipe 3, a nitrogen monoxide (NO) oxidation catalyst 4, a NOx reduction catalyst 5, and an ammonia slip oxidation catalyst 6 are disposed in order from an exhaust emission upstream side, and a temperature sensor, a NOx sensor and the like are disposed in front and at the rear of the catalysts to thereby form an exhaust system. However, details are not illustrated.

The oxidation catalyst 4 reduces NO and the like contained in the exhaust emission passing through the exhaust pipe 3 by oxidation reaction, and the oxidation catalyst 4 is provided with a catalyst shell which is made of material such as stainless steel with excellent heat resistance and corrosion resistance and which is in a shape like a large muffler, and which is filled with platinum-coated catalyst pellets with a surface of a porous material made of alumina or the like for example. As the exhaust emission passing through the exhaust pipe 3 flows while in contact with the catalyst pellets in the catalyst shell, NO contained in the exhaust emission is oxidized (burns) and turns into $NO_2$ to thereby enhance an elimination rate of NOx in the reduction catalyst 5 on a downstream side. In synchronization with the above oxidation reaction of NO, hydrocarbon (HC), carbon monoxide (CO), and the like in the exhaust emission are also reduced by oxidation reaction.

The NOx reduction catalyst 5 reduces and purifies NOx in the exhaust emission passing through the exhaust pipe 3 by using a reducing agent, and the NOx reduction catalyst 5 is provided with a monolith-type catalyst carrier supported by a zeolite system active component which catalyst carrier is made of ceramic cordierite or Fe—Cr—Al heat resisting steel and which has a honeycomb-shaped cross section, for example. The active component deposited on the catalyst carrier is activated when the reducing agent is supplied and effectively purifies NOx in the exhaust emission into harmless substances. On the downstream side of the NOx reduction catalyst 5, the ammonia slip oxidation catalyst 6 is disposed.

On the upstream side of the NOx reduction catalyst 5 inside the exhaust pipe 3, the injection nozzle 7 is disposed and the reducing agent is injection-supplied together with pressurized air into the exhaust pipe 3 from a reducing agent supply device 8 through the injection nozzle 7. Although the injection nozzle 7 protrudes substantially orthogonal with respect to a flow direction A of the exhaust emission in the exhaust pipe 3, a tip end portion of the injection nozzle 7 may extend downstream and substantially parallel with respect to the flow direction A of the exhaust emission. To the reducing agent supply device 8, the reducing agent-stored in a storage tank 9 is supplied through supply piping 10. The injection nozzle 7 and the reducing agent supply device 8 form reducing agent supply means for supplying the reducing agent to a position on the exhaust emission upstream side of the NOx reduction catalyst 5.

In this embodiment, a urea aqueous solution (urea water) is used as a reducing agent injection-supplied by the injection nozzle 7. Also, an ammonia aqueous solution and the like may be used. The urea water which is injection-supplied by the injection nozzle 7 hydrolyzes due to exhaust heat in the exhaust pipe 3 to easily produce ammonia. The obtained ammonia reacts with NOx in the exhaust emission in the NOx reduction catalyst 5 and is purified and turned into water and a harmless gas. The urea water is an aqueous solution of solid or powder urea, stored in the storage tank 9, and supplied to the reducing agent supply device 8 through the supply piping 10.

Here, in the invention, an electro-generative-heat carrier 11 is provided on the exhaust emission upstream side of the injection nozzle 7. The electro-generative-heat carrier 11 functions as heating means for heating the exhaust emission in the exhaust pipe 3 to a temperature equal to or higher than a melting point of urea in the urea water, has a porous structure made of material such as stainless steel with excellent heat resistance and corrosion resistance, with a honeycomb-shaped cross section, and produces heat by drawing current from a power supply 12 such as a battery. The electro-generative-heat carrier 11 is disposed through substantially the whole area of a cross section of the exhaust passage of the exhaust system and can rapidly heat the exhaust emission flowing from the exhaust manifold 2.

On the exhaust emission upstream side and in a vicinity of the injection nozzle 7, a temperature sensor 13 is provided. The temperature sensor 13 has a function of operating as a temperature detecting means for detecting a temperature of the exhaust emission in the exhaust pipe 3, in particular, according to this embodiment, detecting the temperature of the exhaust emission on the exhaust emission upstream side and in the vicinity of the injection nozzle 7. Then, according to a detection signal of the temperature of the exhaust emission detected by the temperature sensor 13, operation of the electro-generative-heat carrier 11 is controlled.

The reducing agent supply device 8, the power supply 12, and the temperature sensor 13 are connected to a control circuit 14 formed of a CPU, for example, through signal conductors 15a, 15b, and 15c, respectively, and are operated under the control of this control circuit 14. In other words, the reducing agent supply device 8 is operated to injection-supply the urea water on the exhaust emission upstream side of the NOx reduction catalyst 5 from the injection nozzle 7 under a control signal from the control circuit 14 and the control circuit 14 turns the power supply 12 on and off according to the detection signal of the temperature of the exhaust emission from the temperature sensor 13 to thereby draw or interrupt current through the electro-generative-heat carrier 11 to heat the exhaust emission in the exhaust pipe 3 to a temperature equal to or higher than the melting point of urea.

More specifically, the temperature to which the exhaust emission in the exhaust pipe 3 is heated by heat generation of the electro-generative-heat carrier 11 is made equal to or higher than 132° C. which is the melting point of urea. Thus, even if the temperature of the exhaust emission from the engine 1 is lower than the melting point of urea, the exhaust emission on the exhaust emission upstream side and in the vicinity of the injection nozzle 7 is heated to or over 132° C. to thereby suppress deposition of urea on the inner wall face of the exhaust pipe 3.

The temperature to which the exhaust emission in the exhaust pipe 3 is heated by heat generation of the electro-generative-heat carrier 11 is equal to or higher than 160° C. Thus, even if the temperature of the exhaust emission from the engine 1 is lower than 160° C., the exhaust emission on the exhaust emission upstream side and in the vicinity of the injection nozzle 7 is heated to or over 160° C. to thereby suppress deposition of urea on the inner wall face of the exhaust pipe 3 and to permit the urea aqueous solution to produce ammonia in a large quantity beyond expectation.

Figure 2:
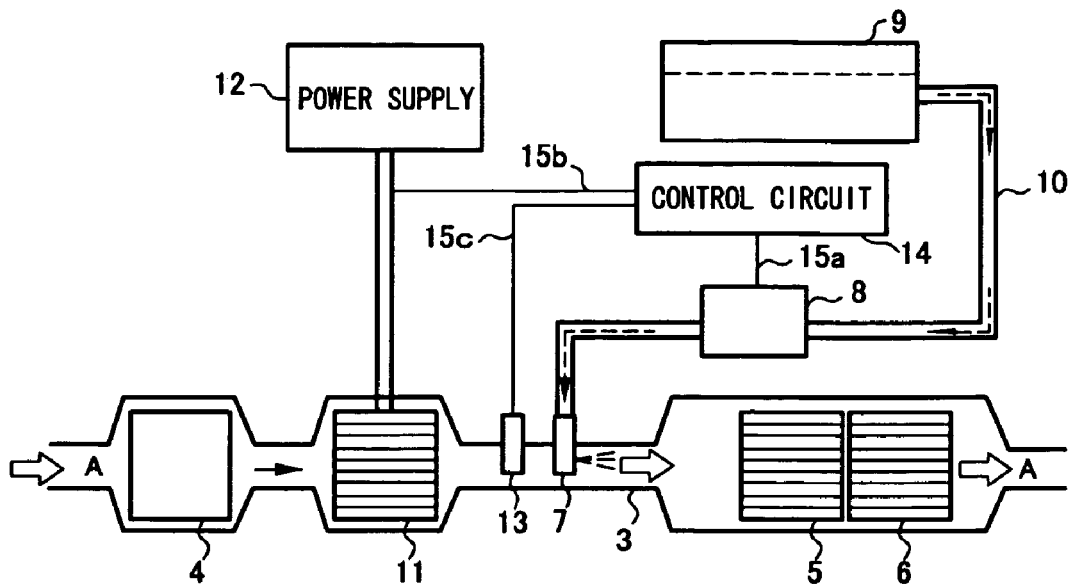
FIG. 2 is a diagrammatic view illustrating an essential structure used for explaining the operation of the exhaust emission purifying apparatus.

Next, a description of the operation of the exhaust emission purifying apparatus according to the first embodiment configured as described above will be provided with reference to FIG. 2.

First, in FIG. 1, the exhaust emission resulting from operation of the engine 1 flows from the exhaust pipe 3 through the exhaust manifold 2, passes through the oxidation catalyst 4, the NOx reduction catalyst 5, and the ammonia slip oxidation catalyst 6 disposed at midpoint positions in the exhaust pipe 3, and is emitted into the air from an exhaust outlet of at an end portion of the exhaust pipe 3. At this time, the urea water is injected from the injection nozzle 7 disposed in the passage of exhaust emission at a position on the upstream side of the NOx reduction catalyst 5 inside the exhaust pipe 3. To this injection nozzle 7, the urea water is supplied from the storage tank 9 of the urea water through the supply piping 10 to the reducing agent supply device 8. The urea water is injection-supplied by operation of the reducing agent supply device 8 into the exhaust emission together with the pressurized air.

In this state, the temperature of the exhaust emission in the exhaust pipe 3 is detected by the temperature sensor 13 provided in the passage of exhaust emission at a position on an upstream side of and in the vicinity of the injection nozzle 7 and the detection signal is sent to the control circuit 14. If the control circuit 14 determines that the temperature of the exhaust emission detected by the temperature sensor 13 is lower than 132° C., for example, the control circuit 14 sends an ON signal to the power supply 12 and supplies current to the electro-generative-heat carrier 11 to cause the carrier 11 to generate heat so as to heat the exhaust emission flowing in the exhaust pipe 3. By the on-off controlling of energization of the electro-generative-heat carrier 11, the exhaust emission can be controlled to have a temperature within a predetermined temperature range.

In this way, operation of the electro-generative-heat carrier 11 is controlled by the control circuit 14 to heat the exhaust emission on the upstream side of the injection nozzle 7 to thereby maintain the exhaust emission at a temperature equal to or higher than 132° C. which is the melting point of urea, for example. At this time the temperature sensor 13 is provided at a position in the passage of exhaust emission on the upstream side and in the vicinity of the injection nozzle 7 and, as a result, the temperature of the exhaust emission on the upstream side and in the vicinity of the injection nozzle 7 is maintained at the temperature equal to or higher than 132° C. Thus, even if the temperature of the exhaust emission from the engine 1 is lower than the melting point of urea, deposition of urea on the inner wall face of the exhaust pipe 3 can be suppressed to enable it to make effective use of the urea water that is supplied from the injection nozzle 7 for the catalytic reduction reaction. Therefore, NOx contained in the exhaust emission can be purified and turned into the harmless components to enhance the elimination rate of NOx.

As another example of temperature control, if the control circuit 14 determines that the temperature of the exhaust emission detected by the temperature sensor 13 is lower than 160° C., for example, the same control circuit sends an ON signal to the power supply 12 and supplies current to the electro-generative-heat carrier 11 so as to cause the carrier 11 to generate heat, which heats the exhaust emission flowing in the exhaust pipe 3. By the on-off controlling of energization of the electro-generative-heat carrier 11, the exhaust emission can be controlled to have a temperature within a predetermined temperature range.

Similarly to the afore description, under control of the control circuit 14, the exhaust emission on the upstream side of the injection nozzle 7 is heated and maintained at a temperature equal to or higher than 160° C., for example. At this time, the temperature of the exhaust emission in the passage thereof on the upstream side and in the vicinity of the injection nozzle 7 is maintained at a temperature equal to or higher than 160° C. as a result. Thus, even if the temperature of the exhaust emission from the engine 1 is lower than 160° C., deposition of urea on the inner wall face of the exhaust pipe 3 can be suppressed and the urea aqueous solution is brought into a state where production of ammonia in a large quantity more than expectation is achieved so as to facilitate NOx reduction reaction and enhance the elimination rate of NOx.

Next, in order to finish injection of the urea water from the injection nozzle 7 due to stopping of operation of the engine 1, supply of the urea water from the storage tank 9 is interrupted by the reducing agent supply device 8 at first and thereafter, only the pressurized air is supplied to the injection nozzle 7 for a while. Thus, the urea water is expelled from a nozzle main body and the injection hole of the injection nozzle 7 to finish injection of the urea water.

Figure 3:
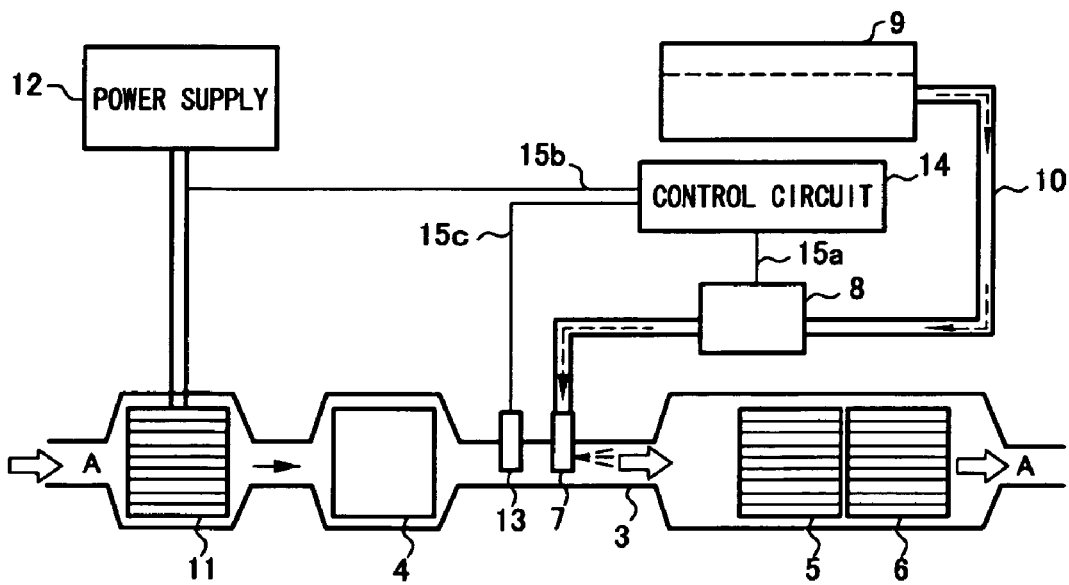
FIG. 3 is a diagrammatic view illustrating an essential structure of another example of the exhaust emission purifying apparatus.

FIG. 3 shows an essential constitution of another example of the exhaust emission purifying apparatus according to the first embodiment. In this example, in the system structure of the exhaust system, respective positions of disposition of the oxidation catalyst 4 and the electro-generative-heat carrier 11 are exchanged, i.e. the electro-generative-heat carrier 11 is disposed at a position in the passage of exhaust emission on the upstream side of the oxidation catalyst 4. Other structures are completely the same as those of the embodiment in FIGS. 1 and 2, and the same effects can be obtained.

In the above description, the electro-generative-heat carrier 11 having the porous structure is disposed through substantially the whole area of the cross section of the exhaust passage so that it may function as the heating means that heats the exhaust emission in the exhaust passage to a temperature equal to or higher than the melting point of the dissolved matter of the reducing agent. However the invention is not limited to this. Other devices may be employed as long as the devices can rapidly heat the exhaust emission in the exhaust passage to a temperature equal to or higher than the melting point of the dissolved matter of the reducing agent. For example, a heater with a heating wire such as a nichrome wire running through substantially the whole area of the cross section of the exhaust passage may be provided.

Figure 4:
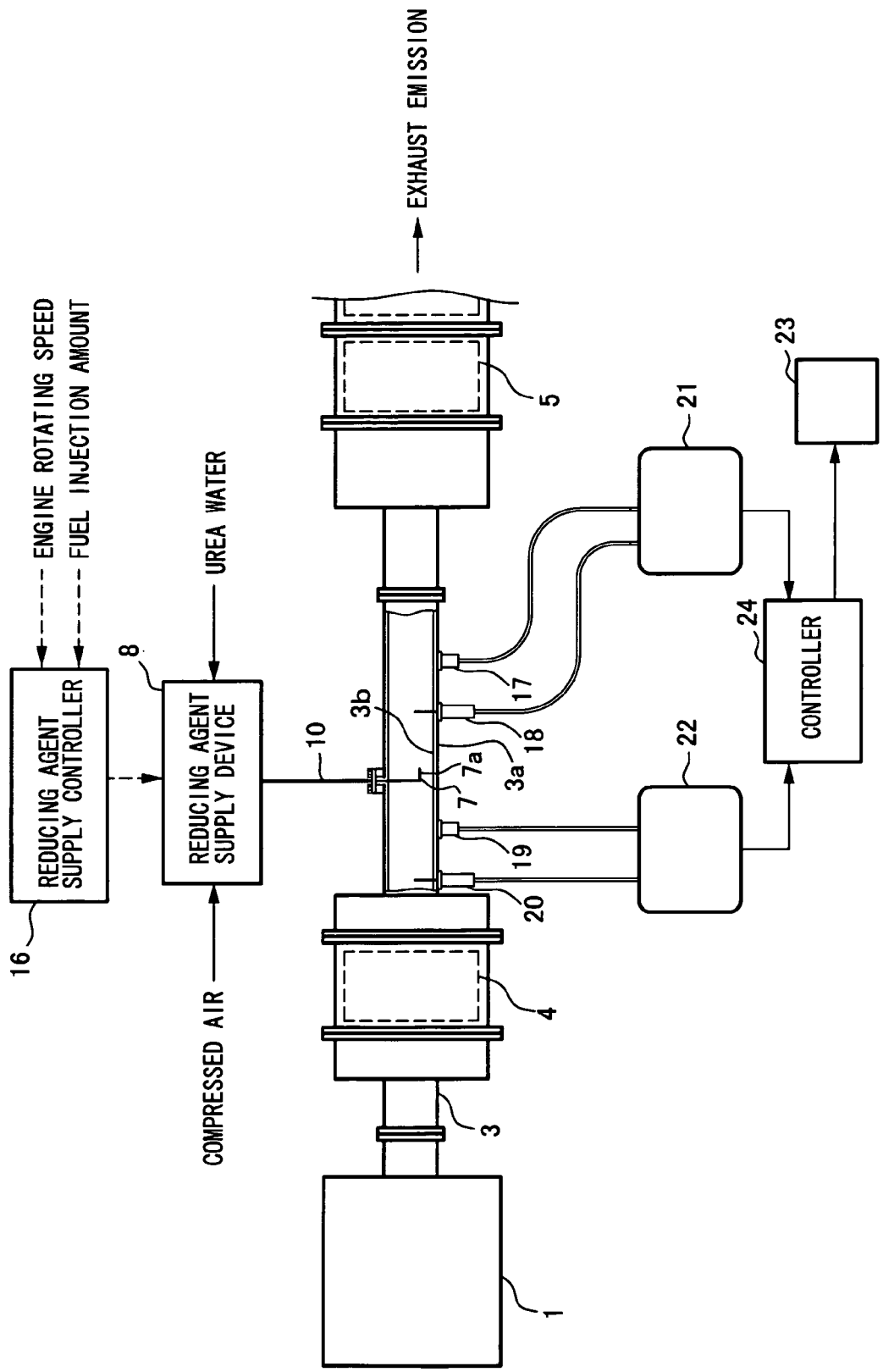
FIG. 4 is a diagrammatic view illustrating a system structure of an exhaust emission purifying apparatus for an engine, according to a second embodiment of the invention.

FIG. 4 shows a structure of an exhaust emission purifying apparatus for an engine according to a second embodiment of the invention. This exhaust emission purifying apparatus is the same in the field of industrial application and the problem to be solved as the exhaust emission purifying apparatus for the engine according to the first embodiment shown in FIG. 1 and aiming to suppress deposition of the reducing agent in the exhaust passage to enhance the elimination rate of NOx even if the temperature of the exhaust emission from the engine is low. The apparatus of the second embodiment detects that constituent of the reducing agent is deposited and accumulates in the exhaust passage.

In FIG. 4, in the exhaust pipe 3 of the engine 1, an oxidation catalyst 4 for oxidizing nitrogen monoxide to nitrogen dioxide and a reduction catalyst 5 for reducing and purifying NOx are disposed in this order from the exhaust emission upstream side. On the exhaust emission upstream side of the NOx reduction catalyst 5, the injection nozzle 7 with an injection hole 7a which is opened in the exhaust pipe 3 to supply the urea water as the reducing agent toward exhaust emission downstream, is disposed.

The injection nozzle 7 is connected to the reducing agent supply device 8 to have a fluid communication therebetween through the supply piping 10. The urea water and compressed air are supplied to the reducing agent supply device 8 and the urea water is injection-supplied together with the compressed air from the injection nozzle 7 into the exhaust pipe 3. In order to control a flow rate of the urea water which is supplied to the NOx reduction catalyst 5 according to an operating state of the engine, a reducing agent supply controller 16 incorporating therein an electronic computer is provided. The reducing agent supply controller 9 controls the reducing agent supply device 8 according to the engine operating state, i.e., engine rotating speed and a fuel injection amount input through a CAN (Controller Area Network).

The exhaust pipe 3 at a portion to which the urea water supplied from the injection nozzle 7 adheres is provided with a first temperature sensor 17 for detecting an outer wall temperature T1 of the portion and a second temperature sensor 18 for detecting an exhaust emission temperature T2. Moreover, at a portion on the exhaust emission upstream side of the injection nozzle 7 and to which the injection-supplied urea water does not adhere, a third temperature sensor 19 for detecting an outer wall temperature T3 of the exhaust pipe 3 and a fourth temperature sensor 20 for detecting an exhaust emission temperature T4 are provided.

Temperature detection signals from the first temperature sensor 17 and the second temperature sensor 18 are input to a first subtracter 21, and temperature detection signals from the third temperature sensor 19 and the fourth temperature sensor 20 are input to a second subtracter 22. A controller 24 to which output signals from the first and second subtracters 21, 22 are input, i.e. temperature difference detection signals detected by the first through fourth temperature sensors 17 through 20 are input, and which outputs an alarm actuation signal to an alarm device 23 is provided. The alarm device 23 functions as alarm means for giving an alarm indicating that urea has accumulated in the exhaust pipe 3 by using an indication, a buzzer, and the like.

Figure 5:
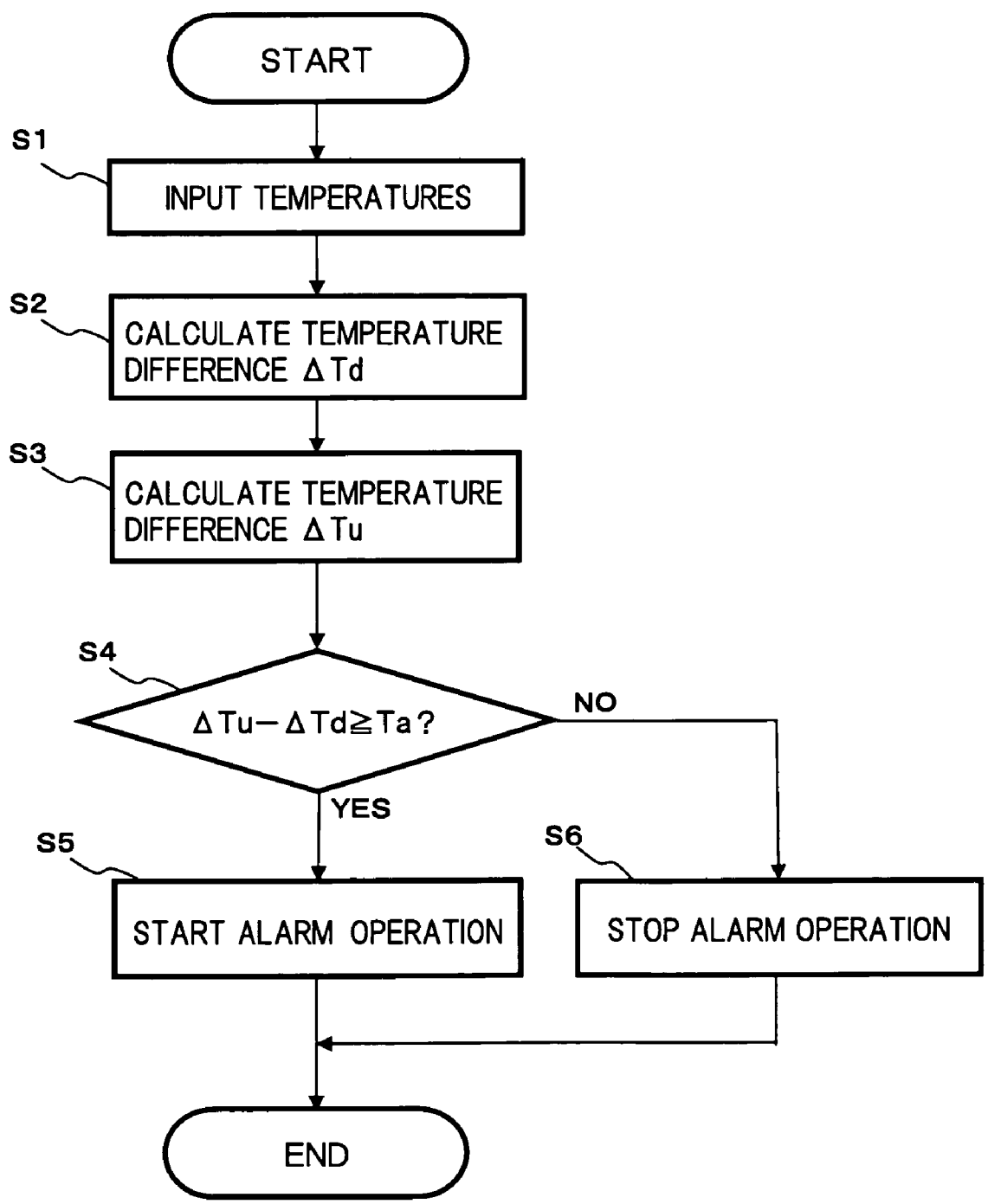
FIG. 5 is a flow chart illustrating a control procedure in a controller of the exhaust emission purifying apparatus.

Here, in FIG. 5, a control procedure performed by the controller 24 of the exhaust emission purifying apparatus according to the second embodiment will be described. First, the controller 24 starts the control when power is supplied by turning on a power supply switch such as a key switch. The control according to the illustrated flow chart is repeatedly performed every predetermined time.

First, at step 1 (referred to as "S1" in the drawings and hereinafter the same shall apply), the outer wall temperatures T1, T3 and the exhaust emission temperatures T2, T4 are input from the first through fourth temperature sensors 17 through 20.

At step S2, the first subtracter 21 subtracts the outer wall temperature T1 from the exhaust emission temperature T2 to obtain a temperature difference $\Delta Td$. The processing at steps S1 and S2 using first temperature sensor 17 and the second temperature sensor 18 corresponds to a first temperature deference detecting means.

At step S3, the second subtracter 22 subtracts the outer wall temperature T3 from the exhaust emission temperature T4 to obtain a temperature difference $\Delta Tu$. The processing at steps S1 and S3 using the third temperature sensor 19 and the fourth temperature sensor 20 corresponds to second temperature difference detecting means.

At step S4, whether a temperature difference obtained by subtracting the temperature difference $\Delta Td$ from the temperature difference $\Delta Tu$ is equal to or greater than a predetermined value Ta is determined. If the temperature difference is equal to or greater than the predetermined value Ta, the procedure goes to step S5. If the temperature difference is smaller than the predetermined value Ta, the procedure goes to step S6. The predetermined value Ta may be set at a value of a difference between the temperature difference $\Delta Td$ and the temperature difference $\Delta Tu$ when urea accumulates in the exhaust pipe 3 by measuring in advance. The processing at step S4 corresponds to first determining means.

At step S5, the alarm actuation signal is output to the alarm device 23. Then, the procedure goes to END. The processing at step S5 corresponds to alarm control means.

At step S6, output of the alarm actuation signal is stopped. Then, the procedure goes to END.

With the above constitution, the exhaust emission from the engine 1 passes through the exhaust pipe 3 and is led to the reduction catalyst 5. At this time, as the reducing agent supply controller 16 controls actuation of the reducing agent supply device 8 based on the engine rotating speed and the fuel injection amount of the engine 1, the urea water of an amount appropriate to the operating state of the engine 1 passes through the supply piping 10 together with the compressed air and is injected from the injection nozzle 7 into the exhaust pipe 3 in the exhaust emission at a position on the upstream side of the NOx reduction catalyst 5. The urea water injected from the injection nozzle 7 hydrolyzes due to the exhaust heat and water vapor in the exhaust emission and produces ammonia while flowing into the NOx reduction catalyst 5 together with the exhaust emission. Then, in the reduction catalyst 5, ammonia reacts with NOx in the exhaust emission to thereby purify and turn NOx in the exhaust emission into water and a harmless gas. Because the oxidation catalyst 4 is provided in the passage of exhaust emission so as to be positioned on the upstream side of the NOx reduction catalyst 5, a proportion of nitrogen monoxide reduces and a proportion of nitrogen dioxide increases in NOx contained in the exhaust emission led into the reduction catalyst 5. In this way, a purifying rate of NOx in the NOx reduction catalyst 5 is enhanced.

At this time, the controller 24 determines that urea has accumulated when the difference between the temperature differences $\Delta Td$ and $\Delta Tu$ becomes equal to or greater than the predetermined value Ta and outputs the alarm actuation signal to the alarm device 23. In response to this, the alarm device 23 actuates an alarm and therefore, it is possible to become aware of the fact that urea has accumulated. The controller 24 may determine whether or not urea has accumulated in the exhaust pipe 3 only when the engine 1 is in a transient operating state. Whether or not the engine 1 is in the transient operating state can be determined by inputting the engine rotating speed and the fuel injection amount to the controller 24 (transient operation detecting means). In this way, it is possible to prevent erroneous detection of the absence of accumulation, even if the urea has accumulated during a steady operation in which the exhaust heat reaches the exhaust pipe 3 through the accumulated urea and thus the difference between the outer wall temperature of the exhaust pipe 3 and the exhaust emission temperature may become small.

Here, a principle on which accumulation of urea in the exhaust pipe 3 can be determined from the difference between the temperature differences $\Delta Td$ and $\Delta Tu$ will be described. When the exhaust emission temperature varies due to a change in the operating state of the engine 1, the temperature difference is caused between the outer wall 3a of the exhaust pipe 3 and the exhaust emission. At this time, at a portion where urea has accumulated on the inner wall 3b of the exhaust pipe 3, the exhaust heat becomes less likely to be transmitted to the outer wall 3a. Therefore, the temperature difference $\Delta Td$ between the outer wall temperature T1 of the exhaust pipe 3 and the exhaust emission temperature T2 becomes greater than the temperature difference $\Delta Tu$ between the outer wall temperature T3 of the exhaust pipe 3 and the exhaust emission temperature T4 at a portion where the urea has not accumulated. Therefore, when there is a difference equal to or greater than the predetermined value between the temperature difference $\Delta Td$ at the portion where the urea has accumulated and the temperature difference $\Delta Tu$ at the portion where the urea has not accumulated, it can be determined that the urea has accumulated on the inner wall 3b of the exhaust pipe 3.

Figure 6:
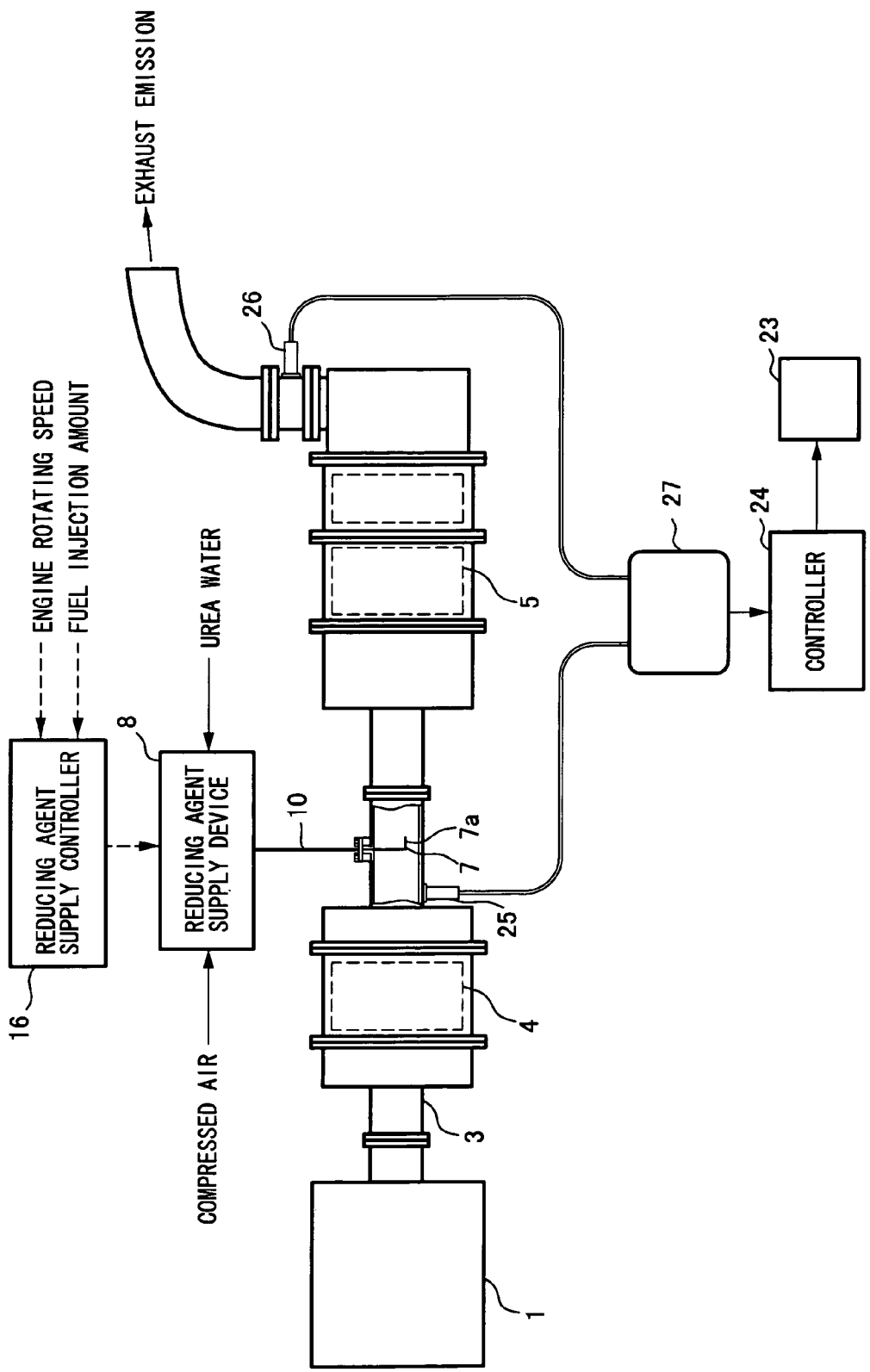
FIG. 6 is a diagrammatic view illustrating a system structure of an exhaust emission purifying apparatus according to another embodiment of the present invention.

FIG. 6 shows a system structure of another example of the exhaust emission purifying apparatus according to the second embodiment. In this example, instead of using the first through fourth temperature sensors 17 through 20 of the exhaust emission purifying apparatus shown in FIG. 4, accumulation of the urea is determined from pressure in the exhaust pipe 3. In other words, there are provided differential pressure detecting means for detecting a differential pressure between a pressure in the exhaust pipe 3 on an exhaust emission upstream side and a pressure in the exhaust pipe 3 on an exhaust emission downstream side of a portion to which the reducing agent adheres, and second determining means for determining that a constituent of the reducing agent has accumulated in the exhaust pipe 3 when the differential pressure detected by the differential pressure detecting means becomes equal to or higher than a predetermined pressure. When the urea accumulates in the exhaust pipe 3, a flow passage area in the exhaust pipe 3 at the portion decreases and a flow resistance increases and therefore a difference between pressures in front and at the rear of the portion where the urea has accumulated becomes large.

For example, as shown in FIG. 6, a first pressure sensor 25 is provided to be disposed at a position on an upstream side of the injection nozzle 7 in the exhaust pipe 3, a second pressure sensor 26 is provided to be disposed at a position on a downstream side of the injection nozzle 7, and a differential pressure gage 27 (differential pressure detecting means) to which detection signals from these pressure sensors 25, 26 are input detects a differential pressure between a pressure in the exhaust pipe 3 on the upstream side of the injection nozzle 7 and a pressure in the exhaust pipe 3 on the downstream side of the NOx reduction catalyst 5. Then, the controller 24 (second determining means) may determine that the urea has accumulated in the exhaust pipe 3 when the differential pressure becomes equal to or greater than a predetermined value Pa.

Although the urea water is used as the reducing agent in the above description, it is possible to similarly detect accumulation of a constituent such as carbon of a reducing agent in the exhaust pipe 3 when diesel oil, gasoline, alcohol or the like is used.

We claim:

1. An exhaust emission purifying apparatus for an engine comprising:
    an oxidation catalyst disposed in an exhaust system of the engine to oxidize nitrogen monoxide in an exhaust emission by oxidation reaction;
    a reduction catalyst disposed in the exhaust system to reduce and purify nitrogen oxides in the exhaust emission by using a reducing agent; and
    reducing agent supply means having an injection nozzle for supplying the reducing agent into the exhaust emission at a position on an upstream side of the reduction catalyst in an exhaust passage of the exhaust system,
    wherein the apparatus further comprises:
        first temperature difference detecting means for detecting a temperature difference between an outer wall temperature of the exhaust passage and an exhaust emission temperature at a portion to which the reducing agent supplied from the injection nozzle adheres;
        second temperature difference detecting means for detecting a temperature difference between an outer wall temperature of the exhaust passage and an exhaust emission temperature at a portion to which the reducing agent does not adhere; and
        first determining means for determining that a constituent of the reducing agent has accumulated in the exhaust passage when the temperature difference detected by the first temperature difference detecting means becomes greater than the temperature difference detected by the second temperature difference detecting means by a value equal to or greater than a predetermined value.

2. The exhaust emission purifying apparatus for the engine according to claim 1, further comprising transient operation detecting means for detecting that the engine is in a transient operating state, wherein the first determining means determines whether or not the constituent of the reducing agent has accumulated in the exhaust passage only when the transient operating state of the engine is detected.

3. The exhaust emission purifying apparatus for the engine according to claim 1, further comprising alarm means for actuating an alarm indicating that the constituent of the reducing agent has accumulated in the exhaust passage and alarm control means for controlling actuation of the alarm means when accumulation of the constituent of the reducing agent in the exhaust passage is determined.

4. The exhaust emission purifying apparatus for the engine according to claim 2, further comprising alarm means for actuating an alarm indicating that the constituent of the reducing agent has accumulated in the exhaust passage and alarm control means for controlling actuation of the alarm means when accumulation of the constituent of the reducing agent in the exhaust passage is determined.

* * * * *